United States Patent
Lu et al.

(10) Patent No.: US 12,159,990 B2
(45) Date of Patent: Dec. 3, 2024

(54) THERMAL INSULATION FIREPROOF CLOTH FOR POWER BATTERIES AND PREPARATION METHOD THEREOF

(71) Applicant: SHANGHAI GUOBO NEW ENERGY TECHNOLOGY CO., LTD., Shanghai (CN)

(72) Inventors: Qiwei Lu, Shanghai (CN); Huashan Liu, Shanghai (CN); Wenjing Yu, Shanghai (CN); Zhiyue Feng, Shanghai (CN); Jie Zhang, Shanghai (CN); Xiangdong Liu, Shanghai (CN)

(73) Assignee: SHANGHAI GUOBO NEW ENERGY TECHNOLOGY CO., LTD., Shanghai (CN)

( * ) Notice: Subject to any disclaimer, the term of this patent is extended or adjusted under 35 U.S.C. 154(b) by 405 days.

(21) Appl. No.: 17/846,831

(22) Filed: Jun. 22, 2022

(65) Prior Publication Data

US 2023/0013935 A1    Jan. 19, 2023

Related U.S. Application Data

(63) Continuation of application No. PCT/CN2022/070735, filed on Jan. 7, 2022.

(30) Foreign Application Priority Data

Jul. 13, 2021 (CN) .......................... 202110791581.5

(51) Int. Cl.
*H01M 10/658* (2014.01)

(52) U.S. Cl.
CPC ................. *H01M 10/658* (2015.04)

(58) Field of Classification Search
None
See application file for complete search history.

(56) References Cited

U.S. PATENT DOCUMENTS

2018/0309107 A1    10/2018   Widener

FOREIGN PATENT DOCUMENTS

| | | |
|---|---|---|
| CN | 86102383 A | 12/1986 |
| CN | 2476582 Y | 2/2002 |
| CN | 103847167 A | 6/2014 |
| CN | 212548044 U | 2/2021 |
| CN | 212789495 U | 3/2021 |
| CN | 112599871 A | 4/2021 |
| CN | 113659263 A | 11/2021 |
| JP | S61245371 A | 10/1986 |
| WO | 2017110037 A1 | 6/2017 |

OTHER PUBLICATIONS

Notice of Reasons for Refusal cited in corresponding Japanese Patent Application No. 2022-513115, dated Jan. 30, 2024, 6 pages.
International Search Report cited in PCT/CN2022/070735 mailed Apr. 13, 2022, 4 pages.

*Primary Examiner* — Arti Singh-Pandey
(74) *Attorney, Agent, or Firm* — Cooper Legal Group, LLC

(57) ABSTRACT

The present application relates to a thermal insulation fireproof cloth for power battery and its preparation method. A thermal insulation fireproof cloth for power battery includes a fireproof cloth made from fireproof fiber, which can include one or more layers. The fire-facing surface of the fireproof cloth is coated with a high-temperature-resistant fireproof inorganic coating, and an unexposed surface of the fireproof cloth is coated with a structure reinforcing coating. The fireproof cloth is made into a box shape matching with a battery pack and arranged between a battery cell and battery housing. The fireproof cloth is made of high-silica fiber fabric or alumina fiber fabric. The fireproof inorganic coating is an inorganic material coating including $SiO_2$ and $Al_2O_3$. The structure reinforcing coating is a coating which contains PTFE, silane, phosphate and alumina.

15 Claims, No Drawings

THERMAL INSULATION FIREPROOF CLOTH FOR POWER BATTERIES AND PREPARATION METHOD THEREOF

CROSS-REFERENCE TO RELATED APPLICATIONS

This application is a continuation of PCT application Ser. No. PCT/CN2022/070735, filed on Jan. 7, 2022, which claims the priority and benefit of Chinese patent application serial no. 202110791581.5, filed on Jul. 13, 2021. The entirety of PCT application serial no. PCT/CN2022/070735 and Chinese patent application serial no. 202110791581.5 are hereby incorporated by reference herein and made a part of this specification.

TECHNICAL FIELD

The present application relates to the technical field of thermal insulation and fire protection of new energy vehicle power batteries, and particularly to a thermal insulation fireproof cloth for power batteries and a preparation method thereof.

BACKGROUND ART

Battery electric vehicle (BEV) refers to a vehicle powered by on-board power supply and driven by motor, which meets the requirements of road traffic, safety regulations and so on. Due to a relatively smaller impact on the environment compared with traditional vehicles, the battery electric vehicle has a widely optimistic prospect, and is regarded as the development trend of the automotive industry in the future. The working principle of a battery electric vehicle includes: battery-current-power regulator-motor-power transmission system-driving the vehicle.

At present, the battery electric vehicle technology is gradually maturing. For the battery electric vehicles, a battery pack is the most important factor affecting the safety of battery electric vehicles. In spontaneous combustion accidents of battery electric vehicles, the problems mostly appear in the battery pack, and the damage of the battery pack may lead to the damage or direct scrapping of the whole vehicle.

Therefore, it is necessary to effectively protect the battery pack of battery electric vehicles to avoid problems in the battery pack that affect the safety of the whole vehicle, or damage to the battery pack due to the occurring of safety problems in the whole vehicle.

SUMMARY

In order to increase the security of an electric vehicle and effectively protect batteries, the present application provides a thermal insulation fireproof cloth for power batteries and a preparation method thereof.

In a first aspect, the present application provides a thermal insulation fireproof cloth for a power battery including a fireproof cloth made from fireproof fiber which includes one or more layers. The fire-facing surface of the fireproof cloth is coated with a high-temperature-resistant fireproof inorganic coating, and the unexposed surface of the fireproof cloth is coated with a structure reinforcing coating. The fireproof cloth is made into a box shape matching with a battery pack and arranged between a battery cell and battery housing.

In the above technical solution, the fireproof cloth made from the fireproof fiber can be used at high temperature, which has excellent fireproof and thermal insulation effect and low thermal conductivity, so that it can effectively protect the battery housing made of aluminum or composite materials from being burn through by the flame, so as to protect the safety of passengers. In an extremely harsh environment, the performance of the battery can be ensured, thereby reducing the attenuation of the battery and ensuring the mileage of the battery. During use, the battery has a small overall volume and light weight, and is easy to be disassembled and replaced, so as to ensure fire safety of the battery.

Optionally, the fireproof cloth is made of high-silica fiber fabric or alumina fiber fabric.

In the above technical solution, the fireproof cloth made of high-silica fiber fabric or alumina fiber fabric can be used at 1500° C. for a long time, and it has the excellent fireproof and thermal insulation effect and low thermal conductivity.

Optionally, the fireproof inorganic coating is an inorganic material coating containing $SiO_2$ and $Al_2O_3$.

In the above technical solution, the fireproof inorganic coating can be expanded at a high temperature, and the expansion ratio can reach up to 300%. After expansion, the air can be isolated, so that the battery can be isolated from the air to protect the battery while achieving an effect of blocking battery radiation and resisting high temperature.

Optionally, the structure reinforcing coating is a coating containing PTFE, silane, phosphate and alumina.

In the above technical solution, the structure reinforcing coating is glass glazed at high temperature, so that the strength of the product can be improved to withstand a high-temperature flame shock of up to 7 Bar.

Optionally, the structure reinforcing coating has a thickness of 0.5-2 mm.

By adopting the above technical solution, the structural strength of the fireproof cloth can be ensured, the weight of the fireproof cloth can be reduced, and the flame can be effectively prevented from penetrating the fireproof cloth.

Optionally, the fire-facing surface of the fireproof cloth is further subjected to a sizing treatment.

By adopting the above technical solution, it is convenient for arranging the fireproof cloth into the interior of the battery housing.

In a second aspect, the present application provides a preparation method of a thermal insulation fireproof cloth for power battery including the following steps:
S1. selecting a fireproof fiber;
S2. weaving the fireproof fiber into a fireproof cloth;
S3. coating a high-temperature-resistant fireproof inorganic coating containing $SiO_2$ and $Al_2O_3$ on a fire-facing surface of the fireproof cloth, coating a structure reinforcing coating containing PTFE, silane, phosphate and alumina on an unexposed surface of the fireproof cloth; and
S4. cutting the fireproof cloth according to size requirements to obtain a finished product.

In the above technical solution, the fireproof cloth can be used at 1500° C. for a long time, and has the excellent fireproof and thermal insulation effect and low thermal conductivity. It can effectively protect the battery housing made of aluminum or composite materials from being burn through by the flame, so as to protect the safety of passengers. In an extremely harsh environments, the performance of the battery can be ensured, thereby reducing the attenuation of the battery and ensuring the mileage of the battery. During use, the battery has a small overall volume and light weight, and is easy to be disassembled and replaced, so as to ensure fire safety of the battery.

Optionally, the fireproof fiber is made of high-silica fiber or alumina fiber.

In the above technical solution, the fireproof cloth can be used at 1500° C. for a long time, and has the excellent fireproof and thermal insulation effect and low thermal conductivity.

Optionally, the structure reinforcing coating has a thickness of 0.5-2 mm.

By adopting the above technical solution, the structural strength of the fireproof cloth can be ensured, the weight of the fireproof cloth can be reduced, and the flame can be effectively prevented from penetrating the fireproof cloth.

Optionally, the fireproof cloth includes one or more layers.

The above technical solution can ensure the fireproof performance of the fireproof cloth.

In summary, the present application can achieve at least one of the following beneficial technical effects.

1. The fireproof cloth can be used at the high temperature of 1500° C. for a long time, and it has the excellent fireproof and thermal insulation effect and low thermal conductivity. It can effectively protect the battery housing made of aluminum or composite materials from being burn through by the flame, so as to protect the safety of passengers. In an extremely harsh environments, the performance of the battery can be ensured, thereby reducing the attenuation of the battery and ensuring the mileage of the battery. During use, the battery has a small overall volume and light weight, and is easy to be disassembled and replaced, so as to ensure fire safety of the battery.

2. After the fireproof inorganic coating is expanded, the air can be isolated, so that the battery can be isolated from the air to protect the battery while achieving the effect of blocking battery radiation.

3. The structure reinforcing coating is glass glazed at a high temperature, so that the strength of the product can be improved to withstand high-temperature flame shocks of up to 7 Bar.

DETAILED DESCRIPTION

The present application will be further described in details below.

The present application discloses a thermal insulation fireproof cloth for a power battery.

The thermal insulation fireproof cloth for power battery includes a fireproof cloth made from fireproof fiber. In particular, the fire-facing surface of the fireproof cloth is coated with a high-temperature-resistant fireproof inorganic coating, and the unexposed surface of the fireproof cloth is coated with a structure reinforcing coating. The fireproof cloth is made into a box shape matching with a battery pack and arranged between a battery cell and battery housing, so as to protect the battery.

The fireproof cloth can include one or more layers depending on different use requirements. In some embodiments, the fireproof cloth is configured as one layer.

For the purpose of cost saving or meeting specific requirements of use environment, the fireproof cloth can be made of high-silica fiber fabric or alumina fiber fabric. Because of the characteristics of the high-silica fiber and alumina fiber, the fireproof cloth can be used at the high temperature of 1500° C. for a long time, and has the excellent fireproof and thermal insulation effect and low thermal conductivity. In some embodiments, the fireproof cloth is made of high-silica fiber fabric.

The high-silica fiber fabric is made from suitable raw materials through drawing, weaving and acid leaching. The high-silica fiber fabric has a silica content of 96-98%, which is mainly used for fireproof insulation at an ultra-high temperature of 1000° C. It has a single fiber with a diameter of greater than 5 μm, and does not contain asbestos or ceramic wool, completely harmless to health.

Alumina fiber is one of the newest ultra-light high temperature insulation materials at home and abroad. It can be made by a "sol-gel" method. In particular, soluble aluminum and silicon salt is made into a colloidal solution with a certain viscosity. The colloidal solution is centrifugally spun into fibrous preform at a high centrifuge speed, and then converted into Al—Si alumina polycrystalline fiber via dehydrating, drying and crystallizing at medium-to-high temperature. The main crystal phase mainly includes corundum phase and a small amount of mullite phase, having a chemical composition of $Al_2O_3$ (95%) plus $SiO_2$ (5%), a fiber diameter of 3-7 μm, a monofilament length of 10-150 mm, white appearance, and smooth, soft and elastic touch, similar to degreased cotton. It possesses both of the characteristics of crystal material and fiber material, having a service temperature of 1450° C.-1600° C., a melting point of 1840° C. and good heat stability. It has a thermal conductivity ⅙ that of an ordinary refractory brick, a bulk density only 1/25 that of the ordinary refractory brick, and an energy-saving rate of 15-45%.

In addition, the fireproof inorganic coating may be a coating including $SiO_2$ and $Al_2O_3$. The fireproof inorganic coating can be expanded at the high temperature, with an expansion ratio of up to 300%. After expansion, the air can be isolated, so that the battery can be isolated from the air to protect the battery while achieve the effect of blocking battery radiation and resisting high temperature. In some embodiments, the expansion ratio is 150%.

At the same time, the structure reinforcing coating may be a coating containing PTFE, silane, phosphate and alumina. The structure reinforcing coating can be glass glazed at a high temperature, providing the product with improved strength and a resistance against high-temperature flame shock of up to 7 Bar.

Depending on the requirements for use, the structure reinforcing coating has a thickness of 0.5-2 mm, so that the weight can be reduced. At the high temperature of 1500° C., the temperature at an unexposed surface of the fireproof cloth can be decreased to as low as 150° C. Flame can be effectively prevented from penetrating the fireproof cloth while the structural strength can be ensured. In some embodiments, the structure reinforcing coating has a thickness of 1 mm.

In actual use, a fire-protection suit is mounted on the battery housing and in a module channel. If it is mounted on the battery housing, the fire-protection suit will be subjected to sizing treatment, so that the fire-protection suit can be fixed. If it is mounted on the module channel, the fire-protection suit needs no processing.

The implementation principle of the thermal insulation fireproof cloth for power battery of the present application is as follows:

the fireproof cloth made from high-silica fiber fabric or alumina fiber fabric can be used at the high temperature of 1500° C. for a long time, and has the excellent fireproof and thermal insulation effect and low thermal conductivity. The fire-facing surface is coated with the fireproof inorganic coating containing $SiO_2$ and $Al_2O_3$, which can be expanded at the high temperature to isolate the air, so that the battery can be isolated from the air to protect the battery while achieving the effect of blocking battery radiation and resisting high temperature. The unexposed surface is coated with the structure reinforcing coating containing PTFE, silane, phosphate and alumina. The structure reinforcing coatings are glass glazed, so that the strength of the product can be improved to withstand high-temperature flame shocks of up to 7 Bar. The structure reinforcing coating has a thickness of 0.5-2 mm, so that the weight can be further reduced. The temperature of the unexposed surface of fireproof cloth can be decreased to as low as 150° C., so that fire can effectively prevented from burning through the battery housing made of aluminum or composite materials, so as to protect the safety of passengers. In an extremely harsh environment, the performance of the battery can be ensured, thereby reducing the attenuation of the battery and ensuring the mileage of the battery.

The present application further discloses a preparation method of the thermal insulation fireproof cloth for power battery.

The method of the thermal insulation fireproof cloth for power battery includes the following steps:

S1. A high-silica fiber or alumina fiber with qualified quality is selected as the fireproof fiber;

S2. The fireproof fiber is woven into the fireproof cloth on a textile machine. The fireproof cloth is one layer or a composite structure of multiple layers depending on use requirements.

S3. The high-temperature-resistant fireproof inorganic coating containing $SiO_2$ and $Al_2O_3$ is coated on the fire-facing surface of the fireproof cloth. The fireproof inorganic coating can be expanded at a high temperature by an expansion ratio of up to 300%. After expansion, the air can be isolated, so that the battery can be isolated from the air to protect the battery and while achieving the effect of blocking battery radiation and resisting high temperature. In some embodiments, the expansion ratio of the fireproof inorganic coating is 150%.

The unexposed surface of fireproof cloth is coated with the structure reinforcing coating containing PTFE, silane, phosphate and alumina. The structure reinforcing coating is glass glazed, so that the strength of the product can be improved to withstand a high-temperature flame shock of up to 7 Bar.

The structure reinforcing coating has a thickness of 0.5-2 mm, which ensures the structural strength of the fireproof cloth, and reduces the weight of the fireproof cloth, while effectively preventing the flame from burning through the fireproof cloth.

S4. The fireproof cloth is cut according to size requirements to obtain a fire-protection suit. In particular, a fire-protection suit is mounted on the battery housing and in a module channel If the fireproof cloth is mounted on the battery housing, the fire-protection suit is subjected to a sizing treatment, so that the fire-protection suit can be fixed.

The fireproof cloth made of high-silica fiber fabric or alumina fiber fabric can be used at 1500° C. for a long time, and has the excellent fireproof and thermal insulation effect and low thermal conductivity. It can effectively protect the battery housing made of aluminum or composite materials from being burn through by the flame, so as to protect the safety of passengers. In an extremely harsh environments, the performance of the battery can be ensured, thereby reducing the attenuation of the battery and ensuring the mileage of the battery.

The above are the preferred examples of the present application, which are not intended to limit the protection scope of the present application. Therefore, all equivalent changes made based on the structure, shape and principle of the present application shall be covered within the protection scope of the present application.

What is claimed is:

1. A thermal insulation fireproof cloth for a power battery, comprising a fireproof cloth made from fireproof fibers, wherein the fireproof cloth comprises one or more layers, a fire-facing surface of the fireproof cloth is coated with a high-temperature-resistant fireproof inorganic coating, and an unexposed surface of the fireproof cloth is coated with a structure reinforcing coating; and the fireproof cloth is made into a box shape matching with a battery pack and arranged between a battery cell and battery housing.

2. The thermal insulation fireproof cloth for a power battery according to claim 1, wherein the fireproof cloth is made of a high-silica fiber fabric or alumina fiber fabric.

3. The thermal insulation fireproof cloth for a power battery according to claim 1, wherein the high-temperature-resistant fireproof inorganic coating is an inorganic material coating containing $SiO_2$ and $Al_2O_3$.

4. The thermal insulation fireproof cloth for a power battery according to claim 1, wherein the structure reinforcing coating is a coating containing polytetrafluoroethylene (PTFE), silane, phosphate and alumina.

5. The thermal insulation fireproof cloth for a power battery according to claim 4, wherein the structure reinforcing coating has a thickness of 0.5-2 mm.

6. The thermal insulation fireproof cloth for a power battery according to claim 1, wherein the fire-facing surface of the fireproof cloth is further subjected to a sizing treatment.

7. The thermal insulation fireproof cloth for a power battery according to claim 2, wherein the fire-facing surface of the fireproof cloth is further subjected to a sizing treatment.

8. The thermal insulation fireproof cloth for a power battery according to claim 3, wherein the fire-facing surface of the fireproof cloth is further subjected to a sizing treatment.

9. The thermal insulation fireproof cloth for a power battery according to claim 4, wherein the fire-facing surface of the fireproof cloth is further subjected to a sizing treatment.

10. A preparation method of a thermal insulation fireproof cloth for a power battery, comprising:
   S1. selecting fireproof fibers;
   S2. weaving the fireproof fibers into a fireproof cloth;
   S3. coating a high-temperature-resistant fireproof inorganic coating containing $SiO_2$ and $Al_2O_3$ on a fire-facing surface of the fireproof cloth, coating a structure reinforcing coating containing polytetrafluoroethylene (PTFE), silane, phosphate and alumina on an unexposed surface of the fireproof cloth; and
   S4. cutting the fireproof cloth according to size requirements to obtain a finished product.

11. The preparation method of a thermal insulation fireproof cloth for a power battery according to claim 10, wherein the fireproof cloth is made of a high-silica fiber fabric or alumina fiber fabric.

12. The preparation method of a thermal insulation fireproof cloth for a power battery according to claim 11, wherein the structure reinforcing coating has a thickness of 0.5-2 mm.

13. The preparation method of a thermal insulation fireproof cloth for a power battery according to claim 10, wherein the fireproof cloth comprises one or more layers.

14. The preparation method of a thermal insulation fireproof cloth for a power battery according to claim 11, wherein the fireproof cloth comprises one or more layers.

15. The preparation method of a thermal insulation fireproof cloth for a power battery according to claim 12, wherein the fireproof cloth comprises one or more layers.

\* \* \* \* \*